US010221744B2

(12) United States Patent
Müller

(10) Patent No.: US 10,221,744 B2
(45) Date of Patent: Mar. 5, 2019

(54) METHOD FOR REGENERATING A PARTICLE FILTER DURING THE OPERATION OF AN INTERNAL COMBUSTION ENGINE

(71) Applicant: MTU FRIEDRICHSHAFEN GMBH, Friedrichshafen (DE)

(72) Inventor: Ralf Müller, Deggenhausertal (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 243 days.

(21) Appl. No.: 15/120,027

(22) PCT Filed: Jan. 27, 2015

(86) PCT No.: PCT/EP2015/000149
§ 371 (c)(1),
(2) Date: Aug. 18, 2016

(87) PCT Pub. No.: WO2015/128053
PCT Pub. Date: Sep. 3, 2015

(65) Prior Publication Data
US 2017/0067384 A1 Mar. 9, 2017

(30) Foreign Application Priority Data
Feb. 25, 2014 (DE) ........................ 10 2014 203 408

(51) Int. Cl.
*F01N 11/00* (2006.01)
*F01N 3/023* (2006.01)
(Continued)

(52) U.S. Cl.
CPC ............. *F01N 9/002* (2013.01); *F01N 3/023* (2013.01); *F01N 3/025* (2013.01); *F01N 11/007* (2013.01);
(Continued)

(58) Field of Classification Search
CPC ........ F01N 11/007; F01N 3/023; F01N 3/025; F01N 9/002; F01N 2590/02;
(Continued)

(56) References Cited

U.S. PATENT DOCUMENTS

| 6,032,461 A | 3/2000 | Kinugasa et al. |
| 8,424,294 B2 | 4/2013 | Schumacher et al. |

(Continued)

FOREIGN PATENT DOCUMENTS

| DE | 69625823 T2 | 9/2003 |
| DE | 102008008566 A1 | 8/2009 |

(Continued)

*Primary Examiner* — Brandon D Lee
(74) *Attorney, Agent, or Firm* — Lucas & Mercanti, LLP; Klaus P. Stoffel

(57) ABSTRACT

A method for regenerating a particle filter during the operation of an internal combustion engine, having the following steps: detecting at least one loading parameter which is characteristic of a present loading of the particle filter, wherein an active regeneration measure can be carried out recurrently in a manner dependent on the loading parameter; determining a time window for a regeneration of the particle filter; and determining a prediction for an operating state of the internal combustion engine expected within the time window, wherein the active regeneration measure at a time indicated for it by the loading parameter is skipped if the prediction predicts that, within the time window, an operating state of the internal combustion engine will arise in which a regeneration of the particle filter takes place without an active regeneration measure.

11 Claims, 2 Drawing Sheets

(51) Int. Cl.
*F01N 9/00* (2006.01)
*F02D 41/02* (2006.01)
*F01N 3/025* (2006.01)

(52) U.S. Cl.
CPC ........ *F02D 41/029* (2013.01); *F01N 2590/02* (2013.01); *F01N 2590/08* (2013.01); *F01N 2590/10* (2013.01); *F01N 2900/12* (2013.01); *F01N 2900/1606* (2013.01); *F02D 2200/701* (2013.01); *Y02T 10/47* (2013.01)

(58) Field of Classification Search
CPC ............. F01N 2590/08; F01N 2590/10; F01N 2900/12; F01N 2900/1606; F02D 41/029; F02D 2200/701; Y02T 10/47
See application file for complete search history.

(56) References Cited

U.S. PATENT DOCUMENTS

| | | | |
|---|---|---|---|
| 2005/0125148 A1* | 6/2005 | Van Buer | G01C 21/3617 701/468 |
| 2011/0088374 A1 | 4/2011 | Johnson | |
| 2012/0203434 A1* | 8/2012 | Sujan | B60W 50/14 701/64 |

FOREIGN PATENT DOCUMENTS

| | | |
|---|---|---|
| JP | 2005233156 A | 9/2005 |
| WO | 2012094646 A1 | 7/2012 |
| WO | 2013135717 A1 | 9/2013 |

* cited by examiner

METHOD FOR REGENERATING A PARTICLE FILTER DURING THE OPERATION OF AN INTERNAL COMBUSTION ENGINE

The present application is a 371 of International application PCT/EP2015/000149, filed Jan. 27, 2015, which claims priority of DE 10 2014 203 408.6, filed Feb. 25, 2014, the priority of these applications is hereby claimed and these applications are incorporated herein by reference.

BACKGROUND OF THE INVENTION

The invention concerns a method for regenerating a particle filter during the operation of an internal combustion engine, a control unit for an internal combustion engine, an internal combustion engine, and a motor vehicle.

With internal combustion engines, the exhaust aftertreatment systems of which comprise a particle filter, there is frequently the problem that said filters can become blocked in the event of high idling proportions or light load proportions of the internal combustion engine operation, because in said operating regions the exhaust gas of the internal combustion engine is too cold to burn the soot collected in the particle filter and thus to regenerate said particle filter. Typically therefore, at least one loading parameter is recorded that is characteristic of a current loading of the particle filter, wherein depending on the loading parameter an active regeneration measure is carried out recurrently. In this case the term "active regeneration measure" refers to a temperature, in particular the exhaust gas temperature, being actively raised to a value at which the accumulated soot in the particle filter is burnt and said particle filter is thereby regenerated. This takes place actively in the respect that the regeneration does not just take place owing to a raised exhaust gas temperature that would occur anyway because of a suitable operating state of the internal combustion engine, but that the temperature is raised regardless of the operating state of the internal combustion engine using other suitable measures. The regeneration is carried out recurrently in the respect that the loading of the particle filter increases again following completed regeneration, so that finally the particle filter has to be regenerated again. Accordingly, the at least one loading parameter also fluctuates with the current loading of the particle filter.

It is a disadvantage of said procedure that each possible active regeneration measure increases the fuel consumption of the internal combustion engine in addition to the normal operation. In addition, an active regeneration measure is superfluous if an operating state of the internal combustion engine exists or is actually to be expected in the near future, in which the exhaust gas temperature is sufficient to regenerate the particle filter even without an active regeneration measure.

SUMMARY OF THE INVENTION

It is therefore the object of the invention to provide a method with which said disadvantages do not occur. Furthermore, it is the object of the invention to provide a control unit, an internal combustion engine and a motor vehicle with which said disadvantages do not occur.

The object is achieved by providing a method in which a time window for a regeneration of the particle filter is determined. Said time window specifies a time interval, preferably starting from a current point in time, within which a regeneration of the particle filter is to take place in order to guarantee undisturbed operation of the internal combustion engine. A prediction is determined for an operating state of the internal combustion engine that is to be expected or a series of operating states that are to be expected within the time window. The active regeneration measure is omitted at a point in time at which it is actually indicated by the loading parameter if the prediction predicts an operating state of the internal combustion engine within the time window in which a regeneration of the particle filter will take place without an active regeneration measure. The active regeneration measure that is actually to be carried out at said point in time is therefore skipped or omitted, since it is to be expected from the prediction that within a permitted time window for the regeneration of the particle filter the internal combustion engine predicts an operating state in which the exhaust gas temperature is high enough to burn the soot accumulated in the particle filter and thus to regenerate said particle filter without the active regeneration measure being necessary. In this way an unnecessary active regeneration is avoided, which contributes to fuel saving.

With a preferred embodiment of the method, the regeneration of the particle filter is indicated by the loading parameter if the value thereof exceeds a previously determined limit value. It is possible that more than one loading parameter is used within the scope of the method. A plurality of loading parameters is preferably used, wherein with a preferred embodiment of the method a regeneration of the particle filter is indicated if at least one of the loading parameters exceeds a previously determined limit value. In this respect the different loading parameters are preferably used as triggers for the regeneration of the particle filter.

Following a regeneration of the particle filter, whether by an active regeneration measure or passively, i.e. during the normal operation of the internal combustion engine at raised exhaust gas temperature owing to the current operating state, the loading parameter is preferably reset if it is not determined anyway based on a measurement value or sensor signal that indicates that the particle filter is no longer loaded or is only lightly loaded following a completed regeneration. Alternatively or additionally, it is possible that an indication condition, in particular the previously determined limit value, is adjusted following the regeneration, in particular increased. This is useful for example if a total mileage or total operating time of the internal combustion engine is used as a loading parameter, wherein following a completed regeneration the previously determined limit value is set to a next mileage value or operating time at which a further regeneration is to take place. An adjustment, in particular an increase, is possibly also useful for a pressure difference or a counter pressure at the particle filter, because this increases over the course of time as a result of loading of the particle filter with ash, which cannot be removed by regeneration.

An embodiment of the method is also preferred that is characterized in that the active regeneration measure for regenerating the particle filter is initiated if it is indicated by the loading parameter, and if moreover the prediction does not predict any operation of the internal combustion engine within the time window in which a regeneration of the particle filter will take place without an active regeneration measure. This can occur in two ways: on the one hand it is possible that the prediction does not yield a reliable result, so that the operating state of the internal combustion engine within the time window cannot be reliably predicted. On the other hand, it is possible that the prediction gives a reliable prediction—in the sense of a negative indication—that within the time window there will not be an operating state in which regeneration of the particle filter will take place without an active regeneration measure. In said cases the active regeneration measure is preferably carried out in order to ensure proper operation of the internal combustion engine. This design has the advantage that the particle filter is regenerated within the time window in any case if this is indicated by the loading parameter, regardless of whether the prediction provides a meaningful value or whether an operating state of the internal combustion engine is achieved in which passive regeneration is possible owing to the increased exhaust gas temperature during normal operation of the internal combustion engine.

As an active regeneration measure the exhaust gas temperature is preferably increased, preferably by induction air throttling, by suitably influencing an exhaust gas recirculation rate, by suitable adjustment of an injection point in time and/or an injection quantity, or by other suitable measures within the engine. Alternatively, it is possible to initiate an active regeneration measure by an additional burner, with which the exhaust gas is heated outside a combustion chamber of the internal combustion engine. Alternatively or additionally, an ultra-late or secondary fuel injection is also possible as an active regeneration measure, with which combustion of the fuel thus injected takes place at an oxidation catalytic converter, which is preferably provided upstream of the particle filter. Alternatively or additionally, it is also possible to heat the exhaust gas electrically in order to carry out the active regeneration measure. Said measures are easily implementable efficient measures for raising the exhaust gas temperature and thereby for regenerating the particle filter regardless of a current operating state of the internal combustion engine.

An embodiment of the method is also preferred with which a running time or a mileage of the internal combustion engine—preferably in the form of a distance on the road, a number of operating hours or a cumulative delivered physical power—, namely a total running time or a total mileage, or a running time or mileage since a last regeneration of the particle filter, is used as a loading parameter. In the latter case, the loading parameter is reset after a completed regeneration—whether active or passive. If by contrast a total running time or a total mileage is considered, it is preferred to adjust the indication condition or the limit value, in particular to increase it, following a completed regeneration—whether active or passive. Alternatively or additionally, it is possible that an exhaust gas counter pressure at the particle filter, a pressure difference falling across the particle filter and/or a soot loading of the particle filter is/are used as (a) loading parameter(s). It is possible that the exhaust gas counter pressure or the pressure difference following a completed regeneration—whether active or passive—indicates the new state of the particle filter. An increase or adjustment of the indication condition or of the limit value can equally be useful and can be carried out in order to take into account increasing ashing of the particle filter. Whereas a measured soot loading indicates the new state of the particle filter following a completed regeneration in any case, a loading model for calculating the soot loading is preferably reset following every regeneration—whether active or passive—in order to compensate deviations in the model.

The exhaust gas counter pressure at the particle filter is preferably recorded by means of a pressure sensor upstream of the particle filter. The soot loading is preferably measured by a suitable measuring device, in particular by a sensor that is suitable for this purpose and that is based on a high frequency measuring technique, and/or is calculated using a loading model—for example depending on a pressure difference falling across the particle filter. Additionally or alternatively, a loading model is preferably used that determines the loading of the particle filter regardless of the pressure difference or counter pressure using at least one operating parameter of the internal combustion engine, such as for example an exhaust gas mass flow, an exhaust gas temperature, a soot emission and/or a concentration of oxides of nitrogen. This is in particular advantageous for reasons of redundancy. Such loading models are well-known, so that they are not dealt with in detail here. The pressure difference falling across the particle filter is preferably either detected by a pressure difference sensor or by two pressure sensors, of which a first is disposed upstream of the particle filter and a second is disposed downstream of the particle filter.

An embodiment of the method is also preferred that is characterized in that the time window is determined in which a soot loading rate of the particle filter is determined. The time still remaining until reaching a previously determined critical soot loading at the determined soot loading rate is determined as a time window. The soot loading rate is preferably calculated by recording the soot loading of the particle filter against time, wherein the time-dependent profile thereof is determined. For example, it is possible that the soot loading against time is derived, or that a difference of the soot loading over a previously determined time interval is calculated. In particular, it is possible to calculate the soot loading rate using a loading model. Alternatively, it is also possible to measure the soot loading rate using a suitable measuring device. A critical soot loading for the particle filter is specified that is not to be exceeded for problem-free operation of the internal combustion engine. In particular, it is possible to calculate the time still remaining to reach the previously determined, critical soot loading from the current soot loading that is preferably calculated or recorded in this respect, the soot loading rate and the previously determined, critical soot loading. This is the time window within which—viewed from a current point in time—a regeneration of the particle filter is to take place in order to ensure undisturbed operation of the internal combustion engine. The type of calculation of the time window that is described here is a simultaneously simple and reliable embodiment of the method.

An embodiment of the method is also preferred that is characterized in that the prediction is determined by determining a load on the internal combustion engine that is to be expected within the time window using position data of the internal combustion engine. In doing so, the position data are preferably determined using satellite-based navigation. Said embodiment of the method is suitable for internal combustion engines that are used in devices that move along locus curves, in particular therefore for internal combustion engines that are used in motor vehicles. With a preferred embodiment of the method, a current location of the internal combustion engine, a route of the internal combustion engine and a current or average speed of the internal combustion engine, with which said engine moves along the route, are used as position data. It is thus possible to determine a time to reach a segment of the route in which an increased load on the internal combustion engine and thereby an increased exhaust gas temperature, which is sufficient for regenerating the particle filter during normal operation, is reached. Such a segment of the route can for example be an upslope that imposes an increased load on the internal combustion engine that is used as the drive device of the motor vehicle. The determination of the prediction using position data enables a very accurate prediction of the load to be expected on the internal combustion engine.

With one embodiment of the method it is possible that the route is entered at the start of the operation, so that the route is known in advance. Alternatively, it is possible that a route prediction is carried out during the process, in particular based on the distance already covered, so that an approximate prediction of the further route is determined. This is in particular possible if the internal combustion engine regularly travels along the same route or at least a very similar route. In this case it is also possible that the route of the internal combustion engine is learnt during the process, in particular by means of a learning algorithm that is configured suitably for this purpose.

An embodiment of the method is also preferred that is characterized in that the prediction is determined by recording at least one operating parameter of the internal combustion engine that is characteristic of an operating state of said engine over a recording time period. Using a profile of the operating parameter in the recording time period, a load on the internal combustion engine that is to be expected within the time window is determined. A recording time period is thus specified, during which an operating parameter of the internal combustion engine is recorded and analyzed, wherein based on the development of the operating parameter in the recording time period, a prediction is made about future operating states of the internal combustion engine within the time window. A load on the internal combustion engine that is to be expected within the time window can also be predicted in this way. In doing so, the determination of the prediction using the at least one operating parameter can be carried out particularly simply, in particular since operating parameters of the internal combustion engine are typically recorded anyway and are analyzed during the various operating methods. The method is particularly simple and can be carried out economically if recourse is made to such operating parameters and possibly the analysis thereof.

The method is preferably carried out periodically and particularly preferably permanently. For this the time window for the regeneration of the particle filter extends, starting from a current point in time, into the future, whereas the recording time period extends into the past. In this case it is possible in principle to use the entire period of time between activation of the internal combustion engine and the current point in time as the recording time period, so that said recording time period increases continuously. Whereas the reliability of the prediction can be increased in this way, this does require a relatively high memory cost. It is less expensive if the recording time period is specified, wherein data that are older than the current point in time minus the recording time period can be continuously cleared, wherein new data can be continuously written over the at least one operating parameter in the memory, which is used or is designed as a ring memory in this respect.

The prediction statement determined during the process is essentially relevant at the points in time at which a regeneration of the particle filter is indicated by the loading parameter. It is therefore economically useful to carry out the method only at selected time intervals about said point in time that are suitable for this purpose, wherein at other points in time the computing and memory costs connected with the method can be saved. Alternatively, it is however preferred that the method is carried out continuously during the operation of the internal combustion engine, wherein the prediction statement is only then used for a decision about an active regeneration measure to be carried out if regeneration of the particle filter is indicated by the loading parameter.

An embodiment of the method is also preferred that is characterized in that the profile of the at least one operating parameter in the recording time period is subjected to pattern recognition. This is used in particular to recognize a recurring series of operating states of the internal combustion engine. This is in particular advantageous if the internal combustion engine is operating under conditions in which recurring operating states occur, in particular in the form of periodic patterns. This is for example the case if the internal combustion engine is being used to drive a dumper truck in a mine, wherein the dumper truck periodically drives down the mine unloaded and drives up again loaded. Another example is a train driven by the internal combustion engine that is always used on the same track. The use of a shunting locomotive or of a watercraft, in particular of a ferry in a ferry service, can also have such a reproducible pattern. Finally, reproducible patterns during the operation of the internal combustion engine can also occur with static applications, for example during the operation of the internal combustion engine for generating electricity, in particular for covering peak loads. In general, such pattern recognition is always possible with a typified uniform operation of the internal combustion engine. In this case a useful recording time period for the pattern recognition depends on the specific use of the internal combustion engine. Therefore, a prediction regarding a useful recording time period is preferably made during the process, in particular the recording time period is preferably learnt during the process, preferably by means of a learning algorithm that is suitably configured for this purpose. Alternatively, it is also possible to predetermine the recording time period based on an envisaged use of the internal combustion engine. Useful recording time periods can be at least 0.5 hours to a maximum of 1 hour, for example when using the internal combustion engine in a local train. When using the internal combustion engine in a long-distance train, the recording time period can be significantly longer, whereas when using the internal combustion engine in a shunting locomotive it can be significantly shorter. The periodicity of the recurring pattern during the operation of the internal combustion engine is significant here. In any case, using pattern recognition, a very accurate prediction of future operating states of the internal combustion engine is possible, in particular for the typified, uniform operation thereof.

An embodiment of the method is preferred that is characterized in that a revolution rate, a load, a fuel injection quantity, an exhaust gas temperature, an exhaust gas mass flow, an exhaust gas volumetric flow, a measurement value of a lambda probe, also known in brief as a lambda value, a concentration of oxides of nitrogen in the exhaust gas, a nitrogen dioxide concentration in the exhaust gas, a ratio of a concentration of nitrogen dioxide to a total concentration of oxides of nitrogen in the exhaust gas, an oxygen concentration in the exhaust gas, a particle concentration in the exhaust gas, a pressure difference falling across the particle filter, and/or an exhaust gas counter pressure—in particular at the particle filter or at a catalytic converter—is/are recorded as (an) operating parameter(s). With a preferred embodiment of the method, at least two of said parameters, preferably a combination of a plurality of said parameters, are used as the operating parameters. Said parameters are characteristic of an operating state of the internal combustion engine and are therefore suitable for recognizing patterns in a series of operating states and for making a prediction therefrom of future operating states that are to be expected. Said parameters can be measured within the method using suitable sensors or can be calculated—in particular based on suitable models.

The object is achieved by providing a control unit configured for performing a method according to one of the previously described embodiments. This results in terms of the control unit in the advantages that have already been described in connection with the method.

It is possible that the control unit is a device for performing the method, in which the method is fixedly implemented in the electronic component structure thereof, therefore in the hardware thereof. Alternatively, it is possible that a computer program product is loaded into the control unit that comprises instructions, based on which a method according to one of the previously described embodiments is carried out if the computer program product is executed in the control unit.

The control unit is preferably in the form of an engine control unit on an internal combustion engine (Engine Control Unit—ECU). Alternatively, it is possible that the control unit is in the form of a separate control unit for performing the method. In this case it is preferably operatively connected to the engine control unit on an internal combustion engine in order to exchange necessary data with said engine control unit within the scope of the method.

The object is also achieved by providing an internal combustion engine. Said internal combustion engine is characterized by a control unit according to one of the previously described exemplary embodiments. The advantages that have already been described in connection with the method are achieved in connection with the internal combustion engine.

The internal combustion engine comprises an exhaust aftertreatment system with a particle filter. Said particle filter is regenerated within the scope of the method. The internal combustion engine preferably comprises an oxidation catalytic converter in the exhaust aftertreatment system upstream of the particle filter. The internal combustion engine comprises moreover at least one device that is configured to perform an active regeneration measure by increasing an exhaust gas temperature, for example by measures within the engine, by secondary fuel injection upstream of an oxidation catalytic converter, a separate burner or an electric heating device for increasing the exhaust gas temperature. All said measures can be carried out by a separate control unit or a control unit that is integrated within the engine control unit (ECU).

With a preferred exemplary embodiment, the internal combustion engine is configured for driving a motor vehicle, in particular an automobile, a commercial vehicle, a dumper truck, a rail vehicle or a watercraft, in particular a ferry, or as a static internal combustion engine, for example for driving a generator for generating electricity.

The internal combustion engine is preferably in the form of a piston engine. With a preferred exemplary embodiment, the internal combustion engine is used to drive in particular heavy land vehicles or watercraft, for example mining vehicles, trains, wherein the internal combustion engine is used in a locomotive or a motor coach, or ships. The use of the internal combustion engine for driving a defense vehicle, for example a tank, is also possible. An exemplary embodiment of the internal combustion engine is preferably also used statically, for example for static power supply in emergency power mode, overload mode or peak load operation, wherein the internal combustion engine preferably drives a generator in this case. The static application of the internal combustion engine for driving auxiliary units, for example firefighting pumps on drilling rigs, is also possible. Furthermore, the application of the internal combustion engine in the field of transporting raw fossil materials and in particular fuels, for example oil and/or gas, is also possible. The use of the internal combustion engine in the industrial sphere or in the construction industry, for example in a construction machine or a building machine, for example in a crane or an excavator, is also possible. The internal combustion engine is preferably in the form of a diesel engine or a gasoline engine.

Finally, the object is also achieved by providing a motor vehicle characterized by an internal combustion engine according to one of the previously described exemplary embodiments. Thus the advantages that have already been described in connection with the method are achieved in connection with the motor vehicle.

A preferred exemplary embodiment of the motor vehicle is in the form of an automobile, a commercial vehicle, a dumper truck, a rail vehicle or a watercraft, in particular a ferry.

BRIEF DESCRIPTION OF THE DRAWING

The invention is described in more detail below using the figures. In the figures.

DETAILED DESCRIPTION OF THE INVENTION

Figure 1:
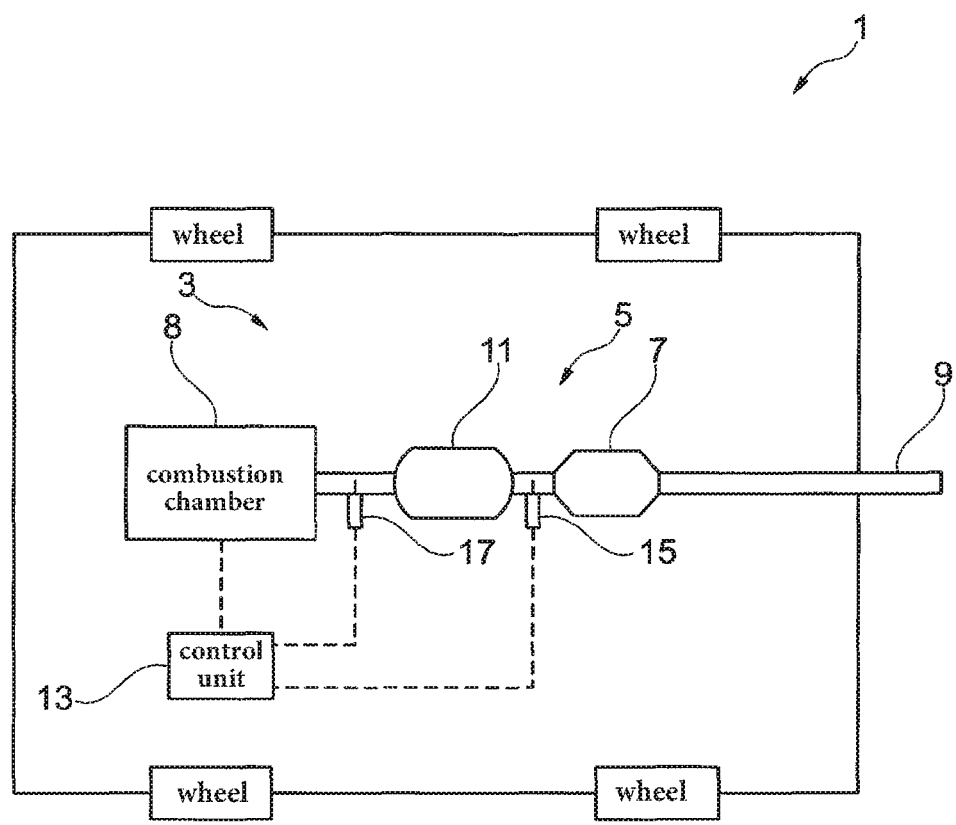
FIG. 1 shows a schematic representation of an exemplary embodiment of a motor vehicle.

FIG. 1 shows a schematic representation of an exemplary embodiment of a motor vehicle 1 comprising an internal combustion engine 3 with an exhaust aftertreatment system 5. The exhaust aftertreatment system 5 comprises a particle filter 7 and an optional oxidation catalytic converter 11 upstream thereof—looking along the flow direction of the exhaust gas in the exhaust aftertreatment system 5 from a combustion chamber region 8 of the internal combustion engine 3 to an exhaust ejector 9. It is possible that the exhaust aftertreatment system 5 comprises further elements that are not shown in FIG. 1, or that an oxidation catalytic converter 11 is omitted.

The motor vehicle 1 comprises a control unit 13 that is configured to perform an embodiment of the method according to the invention. The control unit 13 is preferably in the form of an engine control unit for the internal combustion engine 3 and accordingly works in conjunction therewith.

A pressure sensor 15, by means of which an exhaust gas counter pressure upstream of the particle filter 7 can be recorded, is disposed immediately upstream of the particle filter 7. It is also possible that the pressure sensor 15 is in the form of a pressure difference sensor, with which a pressure difference falling across the particle filter 7 can be recorded. The pressure sensor 15 has an operative connection to the control unit 13, so that the exhaust gas counter pressure or pressure difference detected by the pressure sensor 15 is available in the control unit 13 for use as a loading parameter within the scope of the method. In this case it is in particular possible that the control unit 13 is configured to calculate a soot loading of the particle filter 7 from the measurement value transmitted by the pressure sensor 15 using a loading model.

With the exemplary embodiment represented in FIG. 1, moreover, a sensor of oxides of nitrogen 17, by which a concentration of oxides of nitrogen in the exhaust gas can be detected, is disposed in the exhaust aftertreatment system 5, preferably immediately downstream of the combustion chamber region 8, here preferably upstream of the oxidation catalytic converter 11. The sensor of oxides of nitrogen 17 has an operative connection to the control unit 13, so that the measurement values thereof are available in the control unit 13 for use as operating parameters within the scope of the method.

The internal combustion engine 3 is preferably configured for driving the motor vehicle 1. Said motor vehicle is preferably in the form of an automobile, a commercial vehicle, a dumper truck, a rail vehicle or a watercraft, in particular a ferry.

Figure 2:
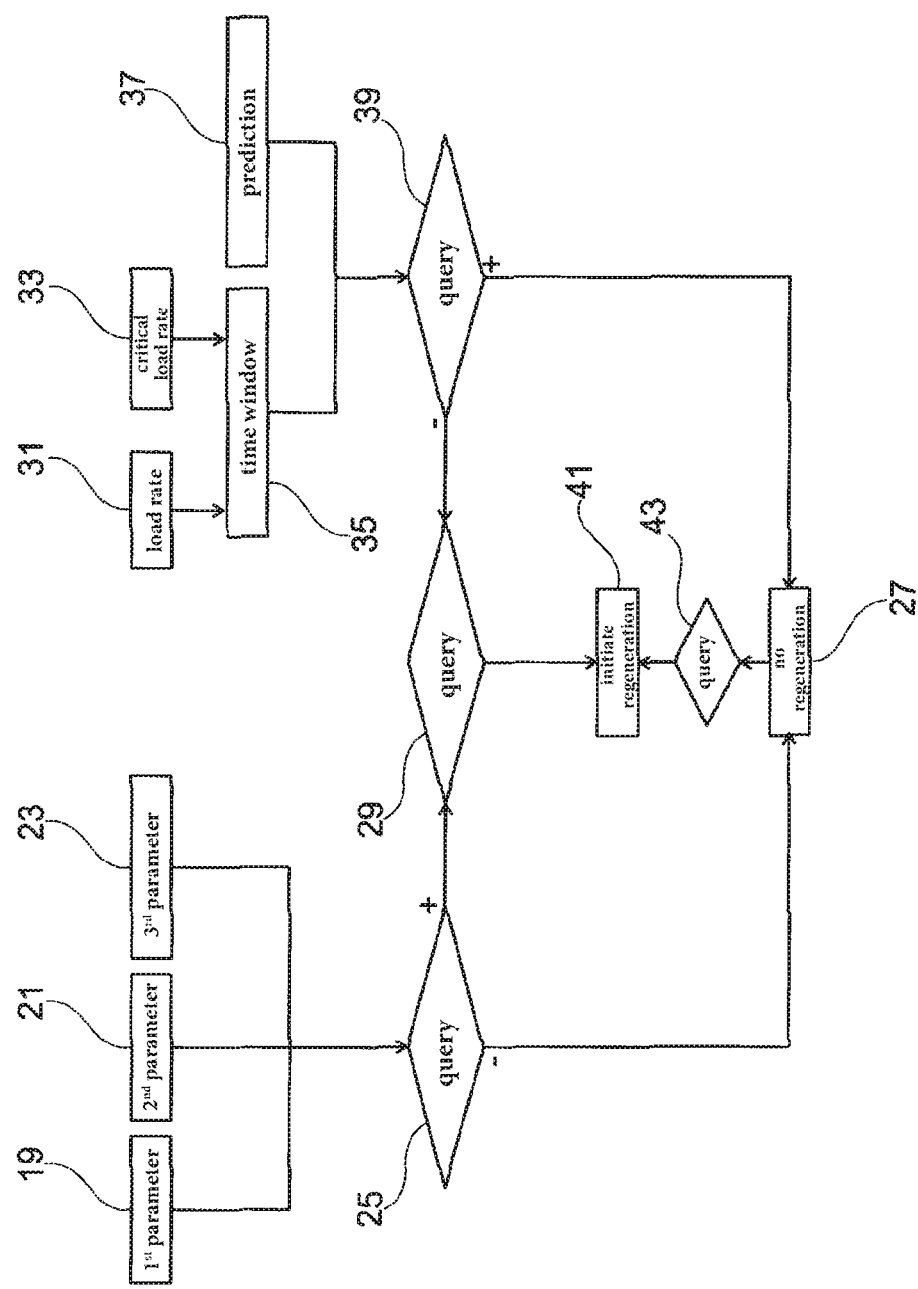
FIG. 2 shows a schematic representation of an embodiment of the method in the form of a flow diagram.

FIG. 2 shows a schematic representation of an embodiment of the method in the form of a flow diagram. In this case, with the embodiment represented here a first loading parameter 19, a second loading parameter 21 and a third loading parameter 23 are recorded. The first loading parameter is preferably a running time or mileage of an internal combustion engine, for example the internal combustion engine 3 according to FIG. 1, in particular a total running time or total mileage, or a running time or mileage that is measured starting from a last regeneration of a particle filter, for example of the particle filter 7 according to FIG. 1. The second loading parameter 21 is preferably an exhaust gas counter pressure or a pressure difference at the particle filter, in particular an exhaust gas counter pressure upstream of the particle filter 7 that is recorded by the pressure sensor 15 according to FIG. 1 or a pressure difference falling across the particle filter 7. The third loading parameter 23 is preferably a measured or calculated soot loading of the particle filter, in particular a soot loading that is calculated using a loading model from a measurement value of the pressure sensor 15 and/or an operating parameter of the internal combustion engine 3.

The three loading parameters 19, 21, 23 are combined with each other for the purposes of trips or triggers, wherein in a query 25 a check is carried out as to whether at least one of the loading parameters 19, 21, 23 exceeds a previously determined limit value for said loading parameter. Accordingly, the loading parameter 19, 21, 23 that first exceeds the previously determined limit value for said loading parameter always triggers a regeneration of the particle filter. This type of analysis of different loading parameters increases the reliability of the internal combustion engine.

With conventional methods, a regeneration of the particle filter by initiating an active regeneration measure is always carried out if it is determined in the query 25 that one of the loading parameters 19, 21, 23 exceeds the previously determined limit value set for it. No active regeneration of the particle filter is carried out if none of the loading parameters 19, 21, 23 exceeds the predetermined limit value set for it.

With the method proposed here, likewise no active regeneration of the particle filter is carried out in a step 27 if it is determined in the query 25 that none of the loading parameters 19, 21, 23 exceeds the predetermined limit value set for it. This is indicated schematically here by a branch characterized by a minus sign.

In contrast to a conventional method for regenerating a particle filter, however, here an active regeneration measure is not necessarily initiated in a case in which the value of at least one of the loading parameters 19, 21, 23 exceeds the predetermined limit value set for it. Rather, here the method passes to a query 29, which is clearly indicated by a branch characterized by a plus sign, in which an additional condition is checked. Said additional condition for an active regeneration measure to be performed is that no operation of the internal combustion engine can be predicted within a permitted time window for a regeneration of the particle filter during which a regeneration of the particle filter will take place without active regeneration measures.

In order to check said condition, the following procedure is used: a soot loading rate 31 of the particle filter is determined, which is preferably calculated using a loading model or is directly measured. For example, it is possible to determine the soot loading rate 31 using a measurement value of the pressure sensor 15 according to FIG. 1. Furthermore, a critical soot loading 33 is predetermined, on reaching which the particle filter is to be regenerated in order to ensure problem-free operation of the internal combustion engine. From the soot loading rate 31 and the critical soot loading 33—possibly with the addition of a current soot loading of the particle filter—a time window 35 is calculated within which a regeneration of the particle filter is to take place.

Moreover, a prediction 37 is determined by which future operating states of the internal combustion engine 3 can be predicted.

In a query 39 a check is made as to whether, based on the prediction 37, an operating state of the internal combustion engine within the time window 35 can be predicted, in which a regeneration of the particle filter will take place even without an active regeneration measure, in particular because an exhaust gas temperature of the internal combustion engine is high enough to regenerate the particle filter 7 without further measures.

The prediction 37 is preferably produced either using position data, in particular by satellite-based navigation, or using pattern recognition based on operating parameters of the internal combustion engine recorded in a recording time period. In this way an operating state of the internal combustion engine that is to be expected is determined.

If it is determined in the query 39 that no suitable operating state can be predicted for the time window 35, either because the prediction 37 does not produce a result or does not produce a reliable result, or because the prediction 37 returns a negative indication, namely that no such operating state is predicted, the method proceeds in a branch that is characterized here by a minus sign. If it is then determined in the query 29 that on the one hand at least one of the loading parameters 19, 21, 23 exceeds the predetermined limit value set for it, and that on the other hand no operating state can be predicted in which a regeneration of the particle filter will take place without active regeneration measures, an active regeneration measure is initiated in a step 41.

If, by contrast, it is determined in the query 39 that an operating state is to be expected within the time window 35 in which a regeneration of the particle filter 7 will take place even without an active regeneration measure, the method proceeds in a branch that is schematically characterized here with a plus sign. In this case, no active regeneration measure is performed in the step 27, in particular an active regeneration measure that is actually due is not performed or is skipped, although this would actually be indicated by at least one of the loading parameters 19, 21, 23.

It is preferably then checked in yet another query 43 whether the predicted operating state is actually entered within the time window 35 and in this respect a regeneration of the particle filter 7 has taken place. If this is not the case, the method proceeds in step 41, wherein an active regeneration measure is initiated in order to ensure undisturbed operation of the internal combustion engine 3. Otherwise the active regeneration measure is omitted—as previously described. In this way an erroneous prediction 37 is intercepted within the scope of the method.

It has been shown overall that using the method fuel for an internal combustion engine can be saved by avoiding unnecessary active regeneration measures.

The invention claimed is:

1. A method for regenerating a particle filter during operation of an internal combustion engine, comprising the steps of:
    recording at least one loading parameter that is characteristic of a current loading of the particle filter, wherein an active regeneration measure can be performed recurrently depending on the loading parameter;
    determining a time window for a regeneration of the particle filter;
    predicting an operating state of the internal combustion engine that is to be expected within the time window;
    actively regenerating the particle filter depending on the load parameters; and,
    skipping the active regeneration measure at a point in time indicated by the loading parameter when the prediction predicts an operating state of the internal combustion engine within the time window in which a regeneration of the particle filter will take place without the active regeneration measure,
    wherein the prediction is determined by recording at least one operating parameter of the internal combustion engine that is characteristic of an operating state of said engine over a recording time period, wherein a load on the internal combustion engine that is to be expected within the time window is determined using a profile of the operating parameter in the recording time.

2. The method according to claim 1, wherein the active regeneration measure for regenerating the particle filter is initiated when indicated by the loading parameter and when at the same time the prediction predicts no operating state of the internal combustion engine within the time window in which a regeneration of the particle filter will take place without an active regeneration measure.

3. The method according to claim 1, wherein the recording step includes recording at least one of: a running time of the internal combustion engine, a mileage of the internal combustion engine, an exhaust gas counter pressure at the particle filter, a pressure difference across the particle filter and a soot loading of the particle filter.

4. The method according to claim 1, wherein the time window is determined by determining a soot loading rate of the particle filter, wherein the time window is a time still remaining until reaching a previously determined critical soot loading at the determined soot loading rate.

5. The method according to claim 1, wherein the prediction is determined by determining a load on the internal combustion engine that is to be expected within the time window using position data of the internal combustion engine.

6. The method according to claim 5, wherein the position data is determined by satellite-based navigation.

7. The method according to claim 1, wherein the profile of the operating parameter in the recording time period is subjected to pattern recognition.

8. The method according to claim 1, including recording at least one of:
    a revolution rate, a load, a fuel injection quantity, an exhaust gas temperature, an exhaust gas mass flow, an exhaust gas volumetric flow, a measurement value of a lambda probe, a concentration of oxides of nitrogen in exhaust gas, a concentration of nitrogen dioxide in exhaust gas, a ratio of a concentration of nitrogen dioxide to a total concentration of oxides of nitrogen in exhaust gas, an oxygen concentration in exhaust gas, a particle concentration in exhaust gas, an exhaust gas counter pressure upstream of the particle filter and a pressure difference falling across the particle filter as the loading parameter.

9. A control unit configured to implement the method according to claim 1.

10. An internal combustion engine, comprising: an exhaust gas aftertreatment system having a particle filter; a combustion chamber; and a control unit according to claim 9.

11. The internal combustion engine according to claim 10, wherein the internal combustion engine is configured for driving a motor vehicle or as a static internal combustion engine.

* * * * *